US009483378B2

(12) United States Patent
Kopp et al.

(10) Patent No.: US 9,483,378 B2
(45) Date of Patent: Nov. 1, 2016

(54) METHOD AND SYSTEM FOR RESOURCE MONITORING OF LARGE-SCALE, ORCHESTRATED, MULTI PROCESS JOB EXECUTION ENVIRONMENTS

(71) Applicant: Dynatrace LLC, Detroit, MI (US)

(72) Inventors: Michael Kopp, Piberbach (AT); Guenther Gsenger, Linz (AT)

(73) Assignee: Dynatrace LLC, Waltham, MA (US)

(*) Notice: Subject to any disclaimer, the term of this patent is extended or adjusted under 35 U.S.C. 154(b) by 0 days.

(21) Appl. No.: 14/718,547

(22) Filed: May 21, 2015

(65) Prior Publication Data

US 2015/0339210 A1    Nov. 26, 2015

Related U.S. Application Data

(60) Provisional application No. 62/001,358, filed on May 21, 2014.

(51) Int. Cl.
| | |
|---|---|
| G06F 11/34 | (2006.01) |
| G06F 11/30 | (2006.01) |
| H04L 12/26 | (2006.01) |
| H04L 12/24 | (2006.01) |

(52) U.S. Cl.
CPC ........... *G06F 11/3495* (2013.01); *G06F 11/30* (2013.01); *G06F 11/3006* (2013.01); *G06F 11/34* (2013.01); *H04L 43/06* (2013.01); *H04L 43/0817* (2013.01); *H04L 41/14* (2013.01); *H04L 43/065* (2013.01); *H04L 43/067* (2013.01)

(58) Field of Classification Search
None
See application file for complete search history.

(56) References Cited

U.S. PATENT DOCUMENTS

| | | | |
|---|---|---|---|
| 7,496,903 B2* | 2/2009 | Rees .................... | G06F 11/3612 717/124 |
| 8,151,277 B2 | 4/2012 | Greifeneder et al. | |
| 8,234,631 B2 | 7/2012 | Greifeneder et al. | |
| 8,364,519 B1* | 1/2013 | Basu ................ | G06Q 10/06393 705/7.38 |
| 8,464,225 B2 | 6/2013 | Greifeneder | |
| 9,137,136 B2* | 9/2015 | Malloy ................. | H04L 67/025 |
| 2004/0267897 A1* | 12/2004 | Hill ......................... | G06F 9/505 709/217 |
| 2007/0180439 A1* | 8/2007 | Sundararajan ...... | G06F 11/3644 717/158 |

(Continued)

OTHER PUBLICATIONS

Campbell, Understanding and Improving the Diagnostic Workflow of MapReduce Users, Dec. 4, 2011, Association for Computer Machinery, ACM CHIMIT '11, pp. 1-10.*

*Primary Examiner* — Lewis A Bullock, Jr.
*Assistant Examiner* — Bruce S Ashley
(74) *Attorney, Agent, or Firm* — Harness, Dickey & Pierce, P.L.C.

(57) ABSTRACT

A system and method for monitoring the process resource consumption of massive parallel job executions is disclosed. The system uses byte code instrumentation to place sensors in methods that receive job execution requests. Those sensors detect start and end of job executions by the process they are deployed to and extract identification data from detected job execution requests that allow the monitor to identify the job request. This job identification data is used to tag resource utilization measures, which allows the monitor to assign measured resource consumptions to specific job executions. The job identification data that identifies the job execution that triggered the transaction is also used to tag transaction tracing data. The generated job specific measures and transaction traces may be used to identify resource intensive job executions and to identify the root cause of the resource consumption.

34 Claims, 12 Drawing Sheets

Tagging Transaction Trace Data with Job Identification Data

(56) References Cited

U.S. PATENT DOCUMENTS

2011/0066894 A1* 3/2011 Berlyant .............. G06F 9/5066
    714/38.1

2013/0212276 A1* 8/2013 Abuelsaad ............ G06F 9/5072
    709/226

* cited by examiner

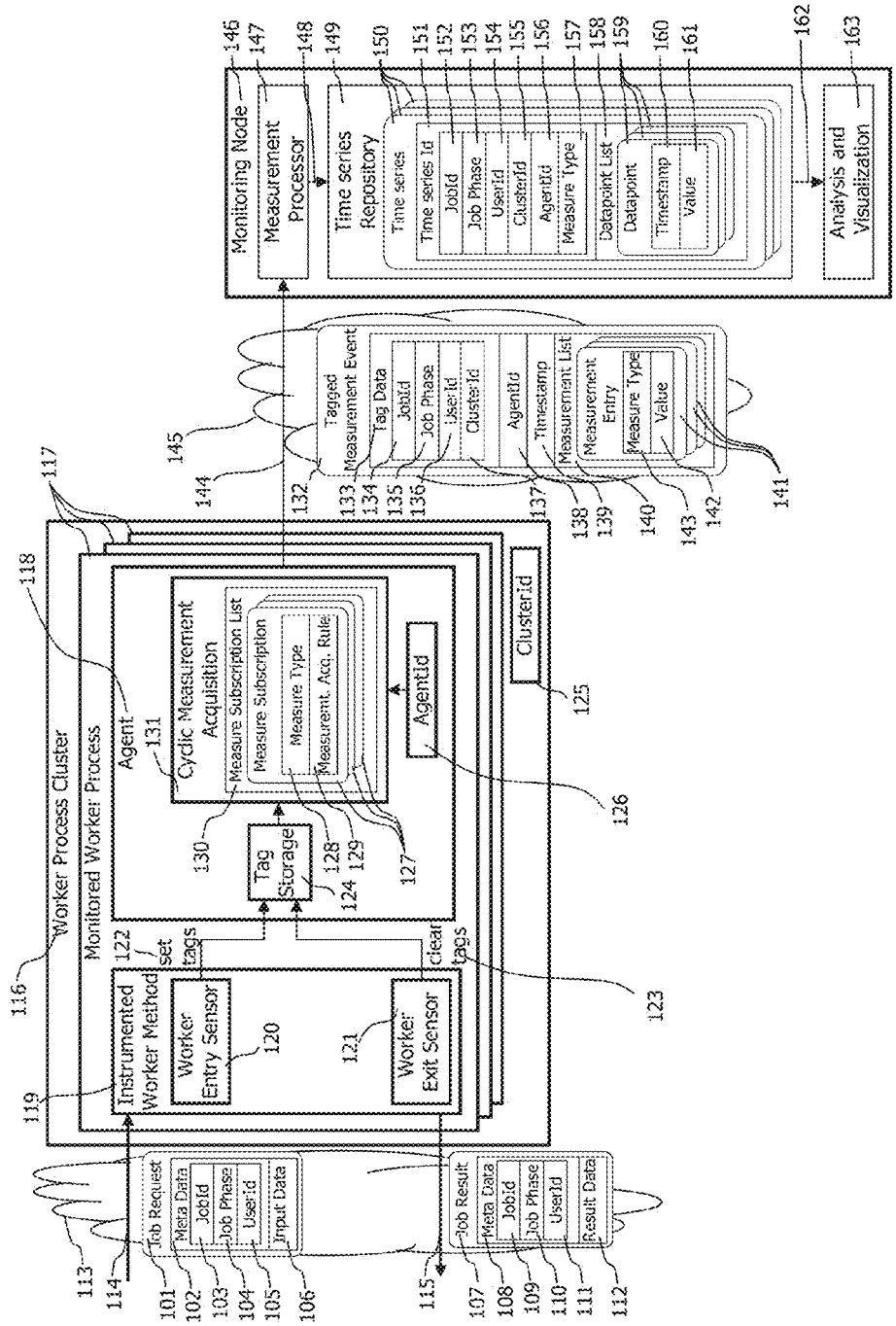
FIG 1: Tagging Cyclic Measurements with Job Identification Data

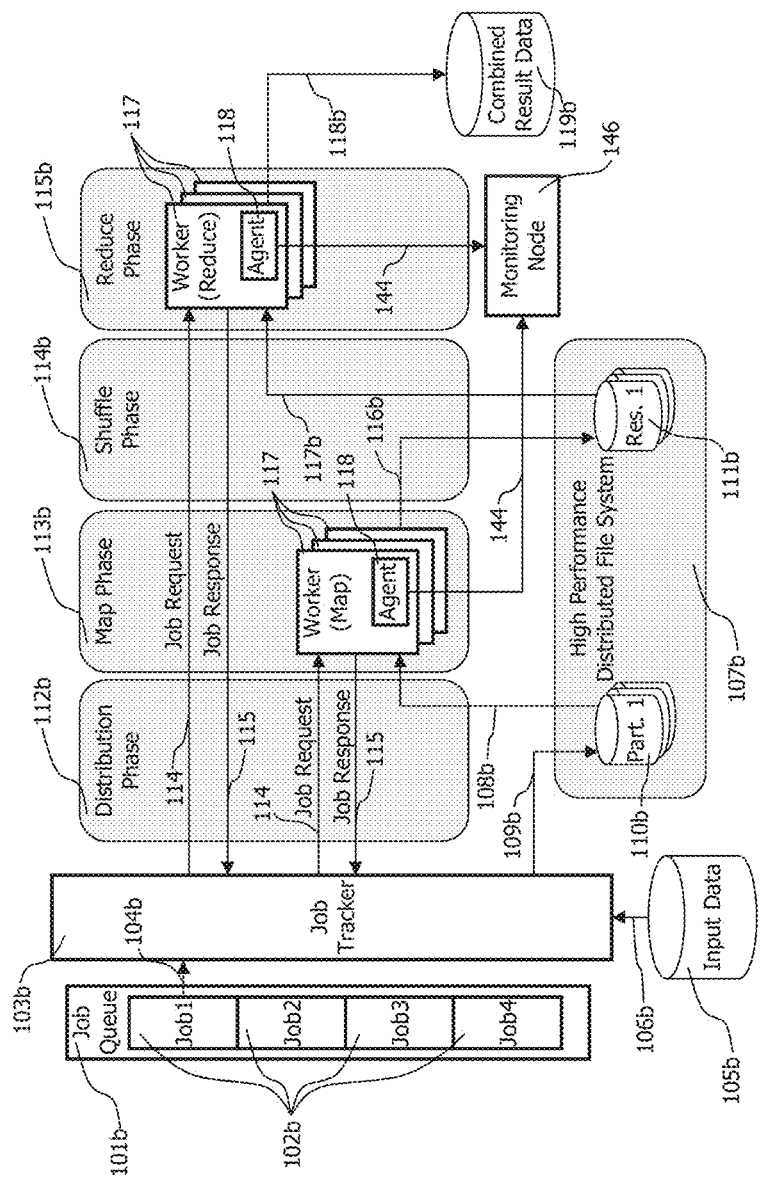

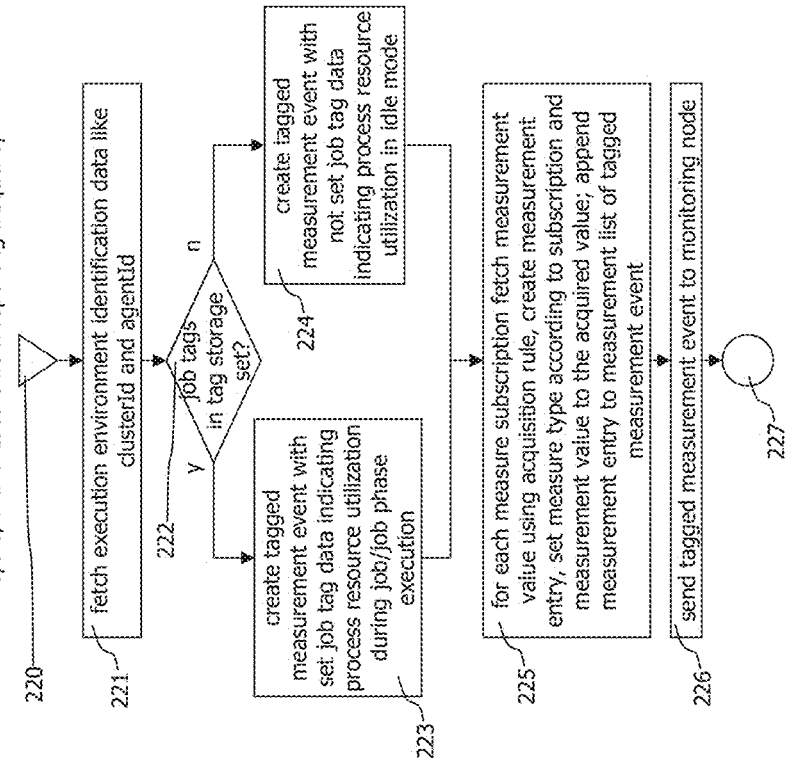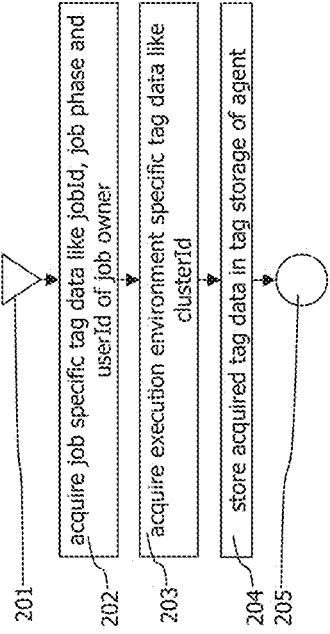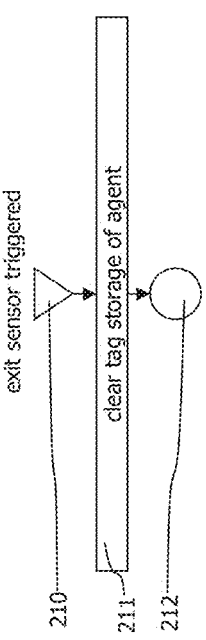

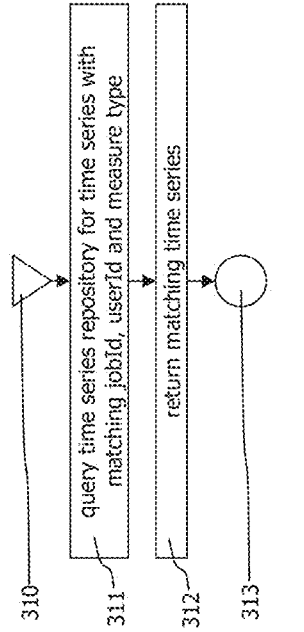

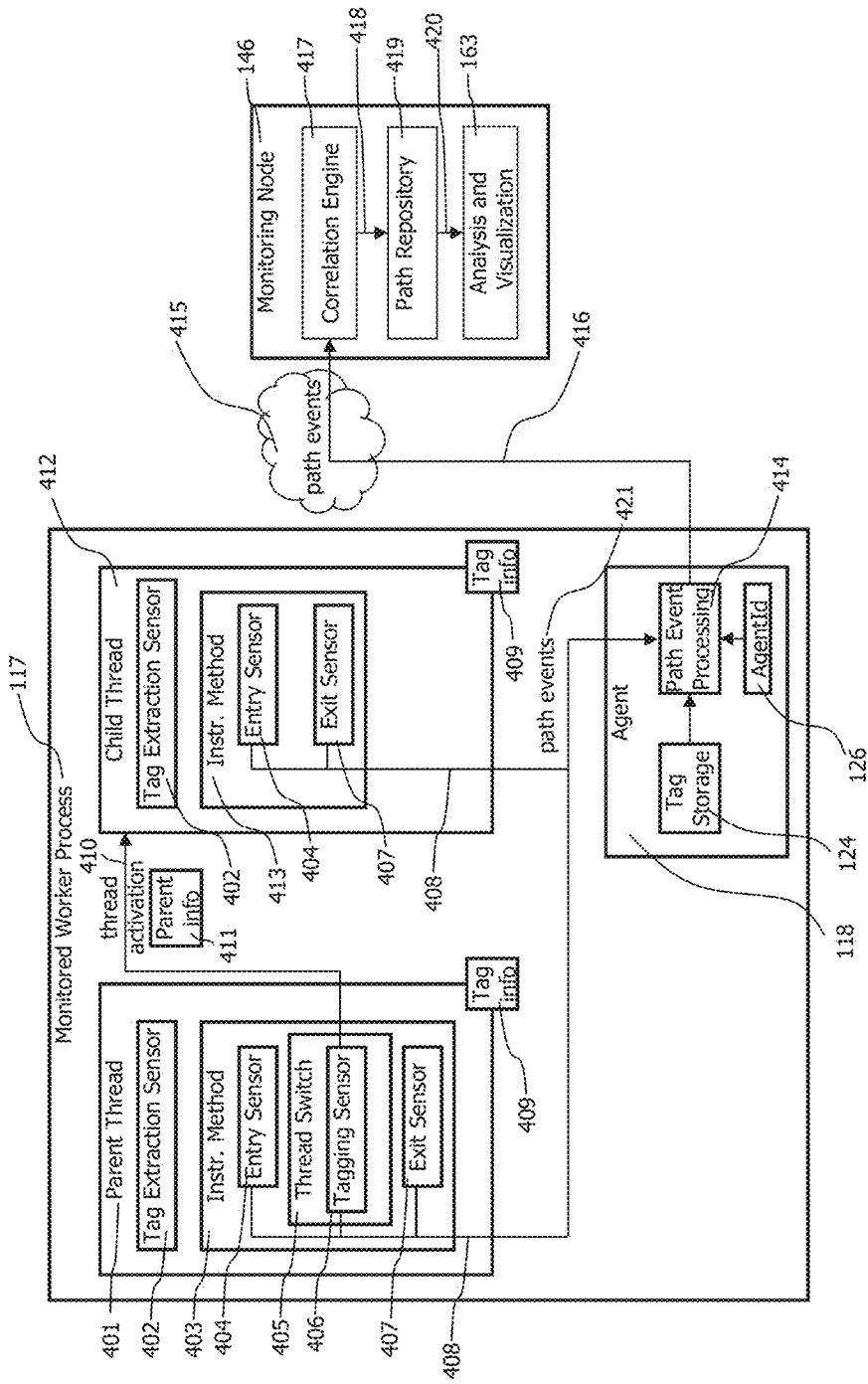
FIG 4: Tagging Transaction Trace Data with Job Identification Data

FIG 5: Extended Event and Data Records to Transfer and Store Job Information Tagged Transaction Trace Data
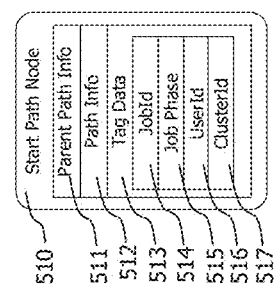
FIG 5a: Start Path Event Node
FIG 5b: Start Path Node

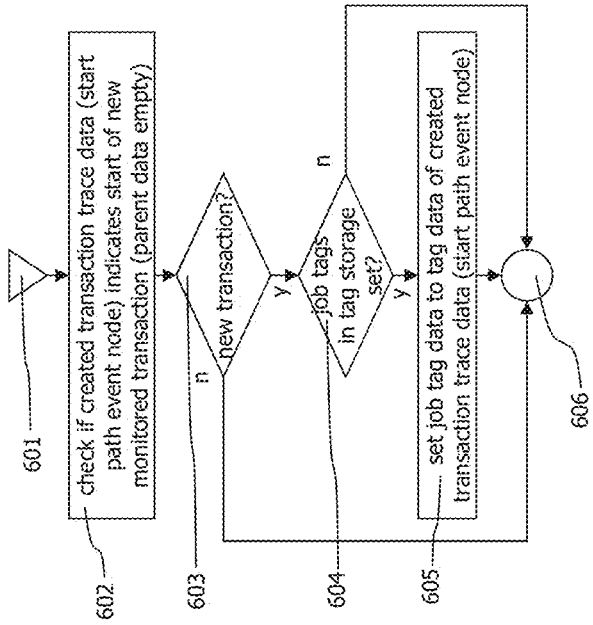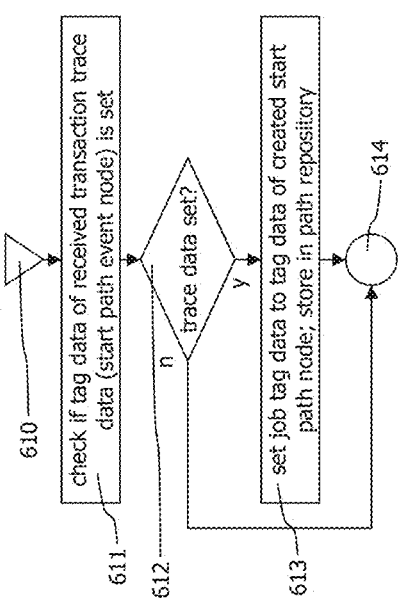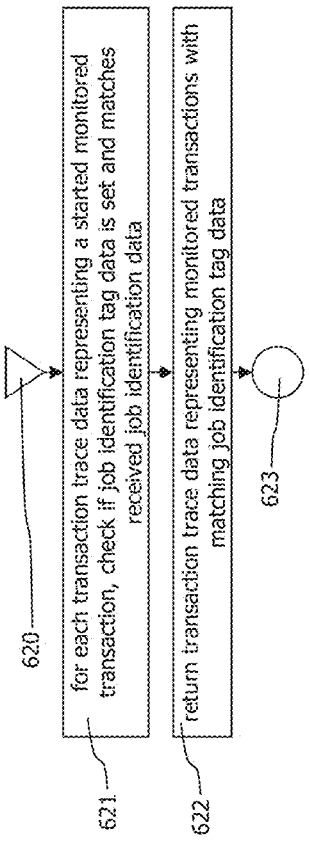

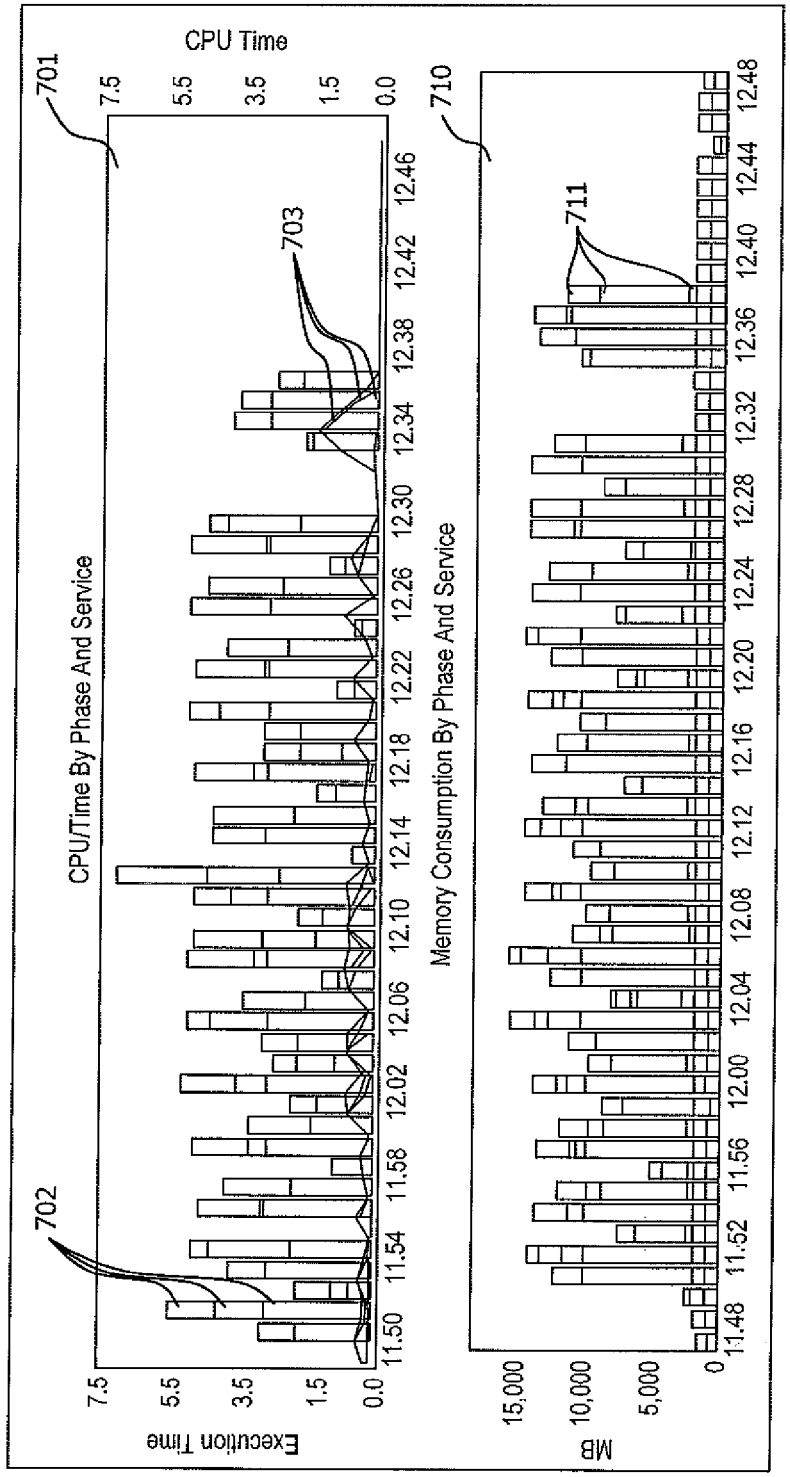
FIG 7: Screenshot of Job Phase Resource Utilization Measurements for a Specific Job

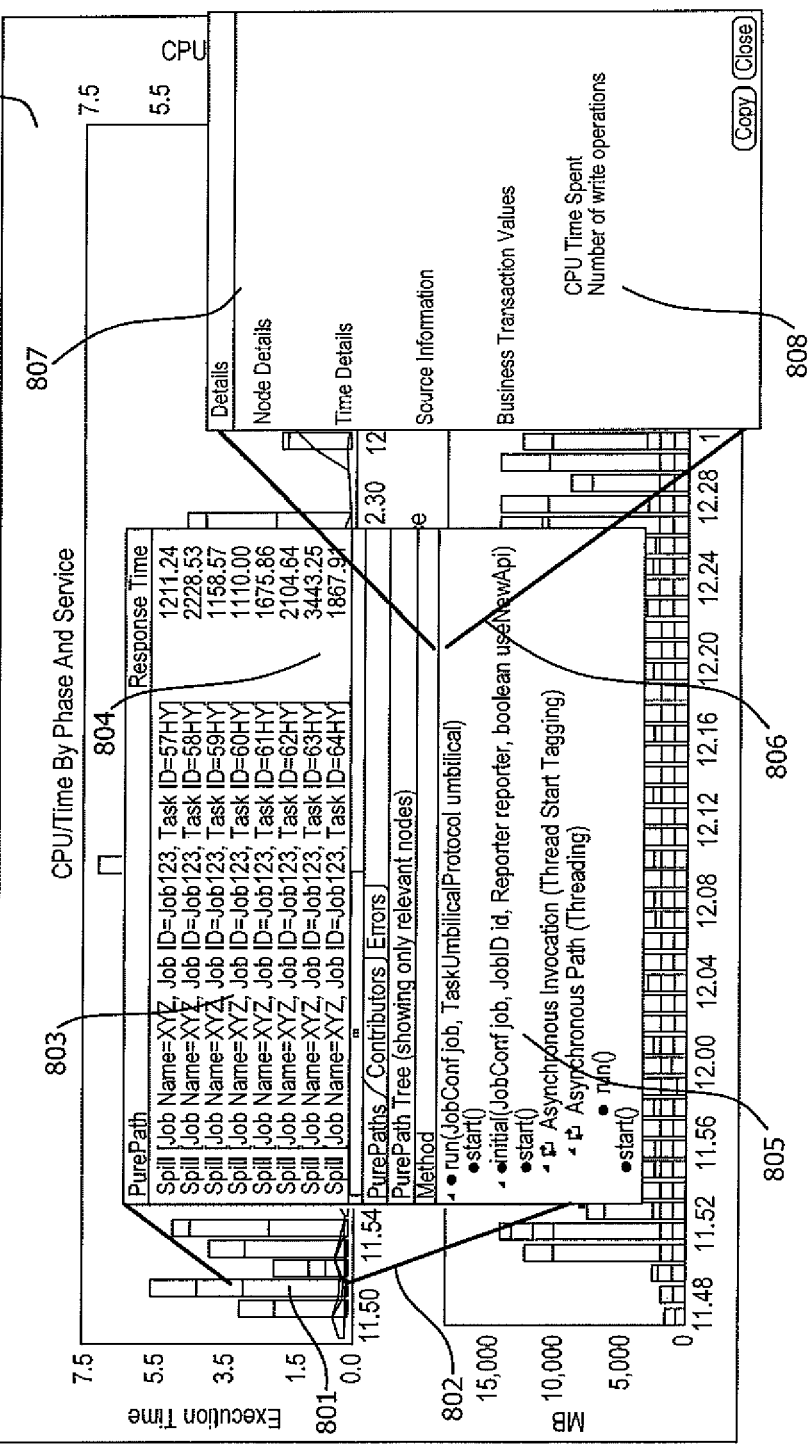
FIG 8: Drilldown to Transaction Trace Data of Specific Phase of a Specific Job Execution

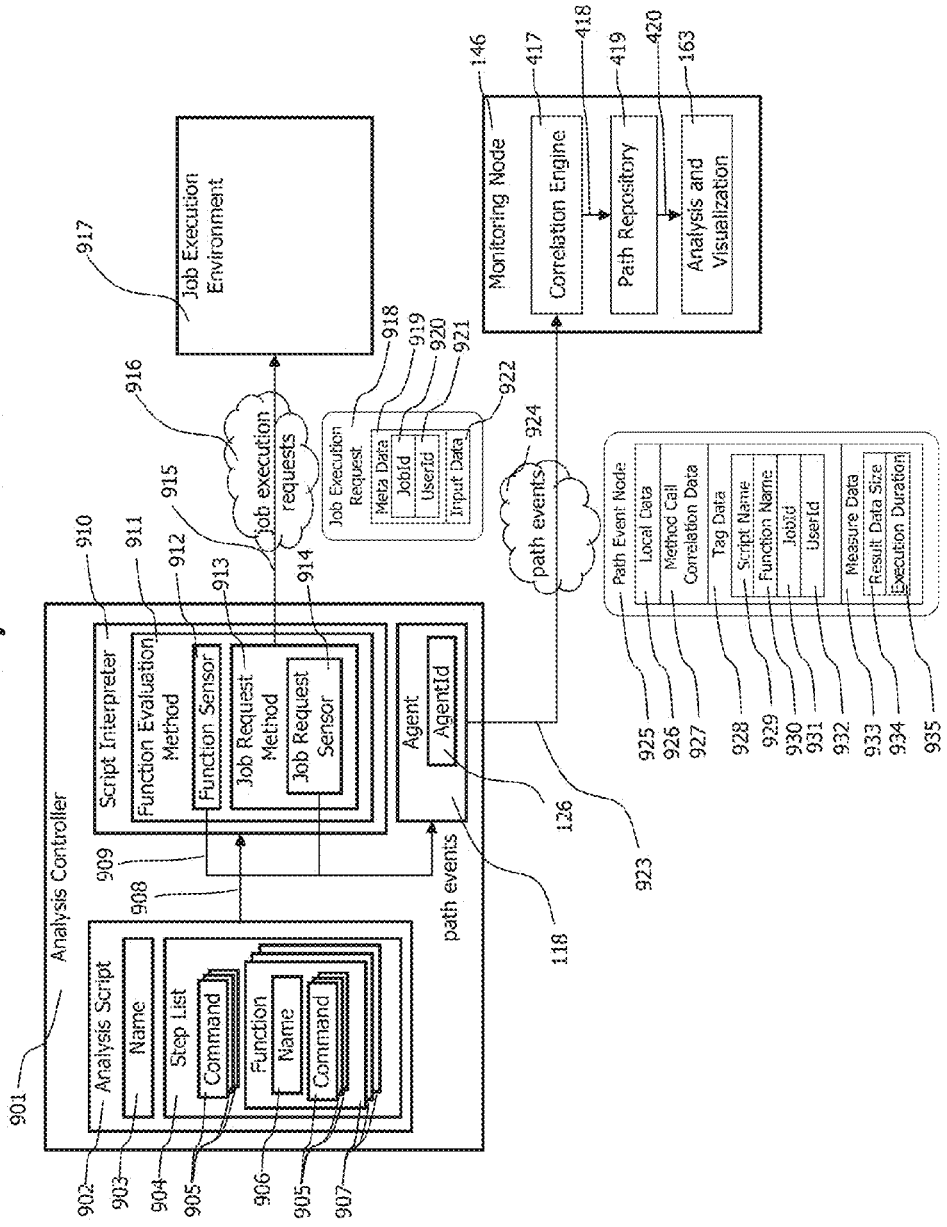

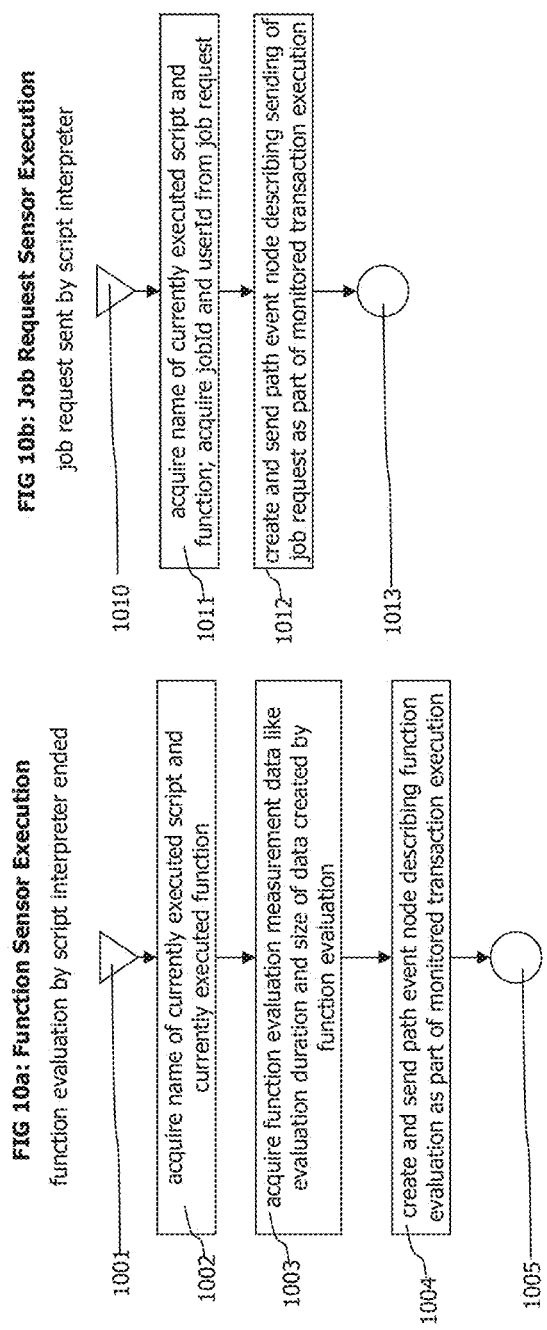

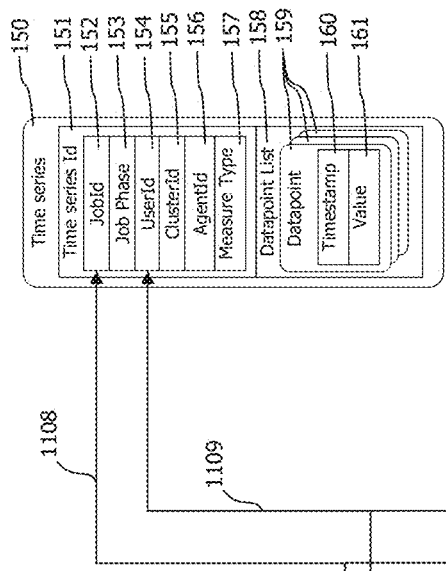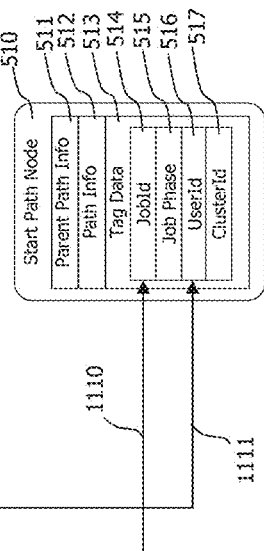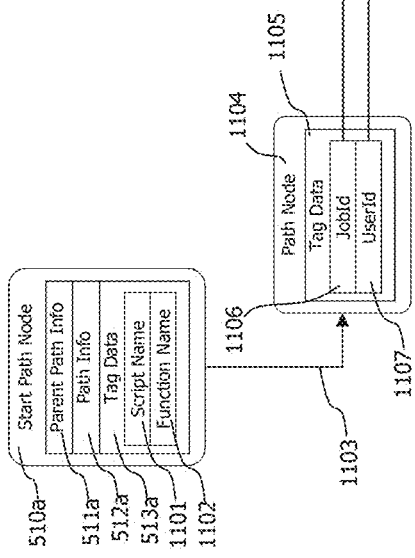
FIG 11: Visual Correlation of Monitoring Data from Analysis Controller with Corresponding Monitoring Data from Worker Processes

METHOD AND SYSTEM FOR RESOURCE MONITORING OF LARGE-SCALE, ORCHESTRATED, MULTI PROCESS JOB EXECUTION ENVIRONMENTS

CROSS-REFERENCE TO RELATED APPLICATIONS

This application claims the benefit of U.S. Provisional Application No. 62/001,358, filed May 21, 2014. The entire disclosure of the above application is incorporated herein by reference.

FIELD

The present disclosure relates to the identification of resource consumptions performed by individual job executions in massive parallel job execution environments, to the identification of individual transaction executions triggered by individual job executions and to a visualization of per job resource consumption measurements and transaction trace data optimized for a fast root cause analysis of job executions showing unexpected resource consumptions.

BACKGROUND

Applications like e-commerce or social media applications are creating unparalleled amounts of data, describing activities performed by their users. Such activities may contain purchase of specific products, expression of sympathy to someone/something or update of social relationships. The amount of created usage activity data measures in terabytes per day for large applications. Valuable information can be extracted from this activity data by relatively simple analysis processes. As an example, a web based video-on-demand company may analyze the user activity data to gain information about the popularity of different videos and movies and may optimize its offerings based on this information.

Massive parallel data processing approaches may be used to subdivide large amounts of data into smaller partitions, perform the analysis tasks on all of those smaller tasks in parallel to get partial results and then combine those partial results to get a global result.

Software components like the Hadoop™ framework developed by the Apache foundation provide processing infrastructure to efficiently manage and execute such massive parallel analysis tasks. However, they lack sufficient monitoring facilities to monitor resource utilization of different individual jobs.

Available, traditional process based resource utilization monitoring systems provide measurements that allow the monitor to evaluate the e.g. CPU and memory utilization of specific processes, but they lack providing the job specific context information that allows to identify specific job executions responsible for resource utilizations. Knowledge about the process resources used by different jobs is an essential precondition for job optimizations. Only this knowledge allows to e.g. optimize those jobs that consume the most resources.

Transaction tracing and monitoring systems provide performance measurement data on code level that allows to identify code segments causing performance problems occurred during the execution of specific, individual transactions. Although this information is of high value to identify performance issues in conventional applications, the provided information is too fine grained to be used as a starting point for the analysis of a performance or resource utilization problem in a massive parallel processing environment.

Consequently, a solution is desired that allows easy identification and diagnosis of performance and resource utilization problems in massive parallel job processing environments.

This section provides background information related to the present disclosure which is not necessarily prior art.

SUMMARY

This section provides a general summary of the disclosure, and is not a comprehensive disclosure of its full scope or all of its features.

The disclosed monitoring technology consists in a monitoring node, agents deployed to worker processes and sensors instrumented to code executed by those worker process. Those worker processes are dedicated to perform partitions of large scale analysis jobs on partitions of large sets of input data in an orchestrated, massive parallel way. The worker processes provide interfaces in form of methods or functions that receive requests to execute a specific job and that return job results after finished job processing. The received job requests contain, next to input data required to execute the job, data describing and identifying the job.

Job requests are sent from a central coordination process that subdivides the large scale input data into smaller chunks that can be processed in parallel and generates and sends corresponding job requests. The coordination process assures that each worker process only processes one job request at a time and also coordinates the combination of partial job results into a combined result.

Worker entry sensors are placed to those job request accepting methods in a way to detect a new received job request, extract job identification data from the job request and forward the extracted job identification data to an agent deployed to the process that received the job request. Additionally, worker exit sensors are placed with job request accepting methods or other methods of the worker process in a way to detect finished processing of a received job request and returning of a job result. Those worker exit sensors signal the detected finished job processing to an agent deployed to the process.

The agents deployed to the worker processes cyclically measure resource utilization parameters of the processes they are deployed to. Those resource utilization parameters may include but are not limited to the CPU, disk space or memory used by the process, or the number of disk or network interactions performed by the process. The agents use job identification data extracted by worker entry sensors to tag measurements of resource utilization parameters with job identification data.

The agents send the tagged resource utilization measurement data to a monitoring node, which incrementally creates a job specific, process resource utilization measurement, time series out of received tagged resource utilization measurements.

In other embodiments, the worker entry and exit sensors may be used in combination with a transaction tracing and monitoring system capable to monitor and trace individual transactions, as described in U.S. Pat. No. 8,234,631, "Method and system for tracing individual transactions at the granularity level of method calls throughout distributed heterogeneous applications without source code modifications" which is incorporated by reference in its entirety herein. The job information data extracted by the worker entry sensors may be used to tag tracing data created on a specific process while the process executes a specific job. The attached tagging data may be used to identify and filter tracing data describing monitored transaction executions performed as part of a specific job execution.

Some massive parallel, distributed big-data analysis systems like Hadoop™ use specialized, location aware distributed file systems like the Hadoop file system (HDFS) to optimize processing. This specialized file system allows for every read operation to determine the locality of the requested data. E.g. the data to read may be available local, on the computer host running the process that performed the read request, available in the same rack, or only available in a remote rack. Typically, a data center is organized in a set of interconnected racks, each rack contains a set of host computers interconnected with a fast computer network. The computer network interconnecting different racks is typically slower.

Procedures and algorithms of Hadoop to allocate worker processes, partition input data and assign it to worker processes are directed to keep processing nodes and required data together and to keep data locality high. However, due to data size constraints or requirements of the analysis tasks, optimized data locality may not be accomplished by those automatisms. Measurements, provided by the disclosed monitoring systems that describe the locality of data reads for each worker process, for each job or job phase may be used to identify locality hot-spots of e.g. specific worker processes performing large amounts of rack or remote level data reads compared to local data reads. This information may be used to manually tune the worker allocation and data partitioning processes of Hadoop.

Components of the disclosed monitoring systems that reside and operate within the execution context of the monitored application, like sensors or agents, may be placed in the execution context by using techniques like byte-code instrumentation or injection. Those techniques allow to adapt the behavior of byte-code based software systems after compile time, without the requirement of time consuming and error prone manual adaptations on source code level.

DRAWINGS

The drawings described herein are for illustrative purposes only of selected embodiments and not all possible implementations, and are not intended to limit the scope of the present disclosure.

FIG. 1 depicts a block diagram of a worker process cluster hosting a set of worker processes to perform parallel job processing together with an agent based monitoring system that monitors job specific resource consumption.

FIG. 1b displays a block diagram of a conceptual deployment of the disclosed monitoring system in a Hadoop™ like environment for massive parallel data analysis.

FIG. 2 provides flowcharts that conceptually describe the agent and sensor side processing to detect start and end of job executions on a specific worker process, to extract job identification data and to create resource consumption measures tagged with job identification data of the job execution causing the resource consumption.

FIG. 3 shows flowcharts exemplary describing the monitoring node side processing of received resource measurements tagged with job identification data to create resource consumption time series and the query for timer series matching specific job identification data.

FIG. 4 displays a block diagram of a worker process monitored by a monitoring system capable to monitor individual transaction executions that uses job identification data identifying a currently executed job to tag transaction tracing data with job identification data allowing to identify the job that caused the monitored transaction execution.

FIG. 5 conceptually describes data records to transfer transaction tracing data describing a portion of a monitored transaction together with corresponding job identification data from an agent to a monitoring node and data records to store portions of transaction tracing data together with job identification data in a path repository of a monitoring node as part of transaction trace data describing monitored end-to-end transactions.

FIG. 6 depicts flowcharts that conceptually describe processes performed on agent and monitoring node side to create and process transaction tracing data tagged with job identification data identifying the job execution that caused the execution of the monitored transaction. Additionally, a process that describes an exemplary query for end-to-end transaction trace data describing transactions caused by a specific job execution is shown.

FIG. 7 provides an exemplary visualization of measured resource consumptions of job executions with specific job identification data over a specific time period.

FIG. 8 exemplary describes visualization and navigation from a monitored unexpected resource utilization by a specific job in a specific time slot to a visualization of transaction trace data describing transactions performed by this job execution during the time slot with unexpected resource utilization. The corresponding transaction trace data helps to identify the root cause of the unexpected resource utilization.

FIG. 9 provides an overview of a monitoring system also covering the analysis controller level of a massive parallel analysis system.

FIG. 10 shows flowcharts describing the execution of function sensors and job request sensors as part of a monitoring system also covering an analysis controller.

FIG. 11 visually shows the correlating of monitoring data describing analysis controller side activities with corresponding worker process side monitoring data.

Corresponding reference numerals indicate corresponding parts throughout the several views of the drawings.

DETAILED DESCRIPTION

Example embodiments will now be described more fully with reference to the accompanying drawings.

The described embodiments and variants are directed to detailed process resource consumption and performance monitoring of job executions performed in massive parallel data analysis tasks. Measurements are performed on a job phase level on individual processes participating in a parallel analysis task. Individual resource consumption measurements and transaction traces are tagged with identification data that allows to identify the corresponding worker process, job and job phase.

This job execution and worker process aware measurement and transaction trace data may be used for various analysis tasks to identify resource consumption or performance problems on job phase level and to identify the root cause of those problems on code level. Additionally, those measures may be used to monitor the locality of data accesses performed by individual worker processes to perform individual job phases.

Referring now to FIG. 1 which shows details of an individual monitored worker process 117. The worker process may be executed on a host computer system (not shown), multiple monitored worker processes may run on one host computer systems and multiple worker processes running on one or multiple host computer systems may form a worker process cluster 116. A cluster ID 125 may be assigned to each worker process cluster to identify individual worker process clusters.

Worker processes may run byte-code based virtual machines, like Java™ virtual machines (JVMs) to perform analysis tasks. Software specialized to the management and execution of parallel analysis tasks, like Apache Hadoop™ may be executed by the JVMs running on the worker processes in addition to code specific for the individual analysis task. This management and execution software provides interfaces to receive job requests 101 and to respond with corresponding job results 107 after local processing.

A job request 101 may contain but is not limited to job request meta-data 102 describing the requested job and job input data 106. A job result 107 may contain job result meta-data 108 and result data 112. Job request meta-data 102 and job result meta-data 108 may contain but are not limited to a jobId 103/109 identifying a specific job to be performed, a job phase 104/110 identifying the phase of the job to be performed (e.g. map, shuffle or reduce for map/reduce based analysis jobs) and an userId 105/111 to identify the user or department that requested the job execution.

Typically, this interface consists in a worker method 119 that receives the job request 101, delegates it to specific analysis functionality from which it receives result data after processing. The result data is encapsulated into a job result 107 and sent back to the sender of the job request.

The worker methods may be instrumented with a worker entry sensor 120 that is placed in code that reads job requests from a network 113 and before the local analysis task starts. The worker entry sensor 120 extracts job identification data like jobId, job phase or userId from the meta-data of the received job request 101 and stores 122 this job identification tag data in a tag storage 124.

A worker exit sensor 121 may be instrumented to the worker method 119 at a time when the local analysis processing is finished and a job result 107 is sent to provide job result data to indicate the local analysis is finished. The worker exit sensor 121 clears 123 the tag storage 124 from tag data identifying the just finished job.

In some implementation variants, different methods may be responsible to receive incoming job requests and to send finished job results. In such implementation variants, the worker entry sensor 120 would be instrumented to the method that receives the job requests and the worker exit sensor 121 would be instrumented to the method that sends the job result.

An agent 118 may be deployed to the monitored worker process 117, the agent may contain an agentId 126 individually identifying the agent instance and the monitored worker process. The agent contains but is not limited to a tag storage 124, which is set and cleared by worker entry and exit sensors, and a cyclic measure acquisition unit 131 which repetitively performs acquisition of resource utilization measures of the monitored worker process according to a measure subscription list 130 and sends 144 those measurements in form of tagged measurement events 132 to a monitoring node 146 connected by a computer network 145.

The measure subscription list 130 contains a set of measure subscriptions 127 which may contain but are not limited to a measure type 128 providing the sematic of measurement values and a measurement acquisition rule 129 describing how a specific measurement can be acquired from the monitored worker process.

An example for a measure subscription for monitoring the memory usage of a monitoring worker process 117 running a Java virtual machine would contain a measure type set to "total memory usage", and a measurement acquisition rule indicating to iterate over all memory pools of the virtual machine and aggregate the used memory of all pools.

A tagged measurement event 132 is used to transfer 144 measurement data from an agent 118 to a monitoring node 146. A tagged measurement event 132 may contain but is not limited to tag data 133 containing a set of tags to describe the context of the contained measurements, an agentId 138 identifying the agent 118 instance and monitored worker process which is the origin of the tagged measurement event, a timestamp 139 containing the point in time at which the contained measurements were acquired and a measurement list 140 containing measurement entries 141 with measure type 143 and measure value 142 for each acquired measurement. Tag data 134 of a tagged measurement event 132 may contain but is not limited to a jobId 134 and a job phase 135 identifying job and job phase which was executed on the monitored worker process while the measurements were acquired, a userId 136 identifying the user or department that requested the job execution and a clusterId 137 identifying the worker process cluster 116 of the monitored worker process 117 which is the origin of the tagged measurement event.

The agent 118 cyclically iterates over the measure subscriptions 127 in its measure subscription list and acquires corresponding measurement values. Afterwards, it creates a tagged measurement event 132, sets tag data 134 with tag data identifying the currently ongoing job execution as stored in the tag storage 124, sets agentId 138 to the agentId 126 of the agent 118, timestamp 138 to the current timestamp and appends a measurement entry 141 to the measurement list 140 of the tagged measurement event for every acquired measurement value.

The tagged measurement event 132 is sent to the monitoring node 146, which forwards it to the measurement processor 147. The measurement processor 147 identifies the matching time series 150 for each measurement entry 141 received with the tagged measurement event.

A time series 150 may contain but is not limited to a time series Id section 151 containing data that uniquely identifies a specific time series within a time series repository 149 and a datapoint list 158 used to store measurement values 161 and a timestamp 160 indicating the point in time when the measurement value 161 was acquired. A time series Id 151 may contain but is not limited to a jobId 152, a job phase 153, a userId 154 and a clusterId 155 providing job related identification data of the time series, an agentId 156 identifying the agent 118 and monitored worker process 117 providing the measurement values of the time series and a measure type 157 identifying the type of the stored measurement values.

Tag data 133, agentId 138 and measure type 143 of the received tagged measurement event 132 are used to find a time series 150 in the time series repository 149 with matching time series Id 151. In case no matching time series is found, a new one is created and inserted into the time series repository 149.

Afterwards, a new datapoint 159 is created with timestamp 139 of the tagged measurement event and value 142 of the current measurement entry 141 and appended to the data point list 158 of the found or created time series 150.

A conceptual overview of an infrastructure for massive parallel data analysis tasks using a map/reduce approach is shown in FIG. 1b. Software libraries and components as provided by Apache Hadoop™ may be used to build and operate such an environment. FIG. 1b also describes an exemplary context in which the monitoring components described in FIG. 1 may be used.

The massive parallel data analysis system uses a map/reduce approach to perform parallel data analysis and consists in a job queue 101b containing jobs 102b to be processed, a job tracker that receives jobs 102b, splits input data 105b into input data partitions 110b optimized for parallel analysis, sends job requests 114 to and receives job responses from a set of worker processes 117 to control and manage the parallel analysis process of the input data. The system uses a high performance distributed file system 107b providing optimized data exchange between worker processes performing the parallel data analysis.

The job queue 101b contains a sequence of jobs 102b, which are sequentially fetched 104b by job tracker 103b. The job tracker analyzes the fetched job 102b and the input data 105b to calculate a partition set 110b of the input data optimized for the current job. Afterwards, it deploys the input data partitions 110b to the high performance distributed file system 107b and creates job requests 114 describing the map phase to worker processes in the distribution phase 112b. Deployment of input data partitions and selection of worker processes to perform the map phase are performed in a way to achieve optimized data locality. Data locality optimization aims to avoid access to remote data by storing data required for an analysis process "near" (i.e. at the same host computer or in the same rack) to the worker process that performs the partial analysis process.

Afterwards, the worker processes 117 that received the job requests 114 to perform the map phase 113b of the analysis process, access their assigned partition of input data 110b, perform the map phase of the analysis process and create partial intermediate result data 111b as result of the map phase 113b.

The intermediate result data partitions 111b are stored in the high performance distributed file system 107b. After the map phase is finished and all intermediate result data partitions are created and available in the high performance distributed file system 107b, the job tracker analyzes the locality of the intermediate result partitions and sends job requests 114 describing the reduce phase of the analysis process to worker processes 117 in a way to achieve optimized data locality in the shuffle phase 114b.

The worker processes 117 that received a job request describing the reduce phase of the analysis job perform the local processing required for the reduce phase 115b and store their local result of the result phase in the combined result data 119b. After the reduce phase is finished and all partial reduce results are merged to the combined result data 119b, processing of the analysis job is finished and the analysis result is available for further use in the combined result data 119b.

An agent 118 is deployed to each worker process 117 which monitors resource utilization and transaction executions performed by the worker process. The agents are sending 144 monitoring data to a monitoring node 146 for analysis, storage and visualization.

Resource utilization monitoring may also include measurements describing the locality of data accesses performed by individual worker processes 117 using the high performance distributed file system. As an example, such measurements may determine the locality level (e.g. local host, local rack or remote) for each data access, count data accesses per locality level over a specific sampling period and provide the per locality level counts as measurements.

If the data analysis process allows it, the map and reduce phases may be performed in an interlocked way, by e.g. starting the reduce phase on worker processes as soon as all required partial intermediate result data required for the specific partial reduce phase is available.

Referring now to FIG. 2 which depicts flowcharts describing agent and sensor side processes to acquire and clear job tag data and the cyclic acquisition and sending of resource utilization measurements.

FIG. 2a describes the execution of a worker entry sensor 120, which is instrumented into a method that receives job requests 101. Worker entry sensors are instrumented to a position of methods receiving job requests where reading the job request from the network is finished and before performing the analysis task described by the job request is started.

Execution of a worker entry sensor 120 is started with step 201 after a job request 101 has been received. Subsequent step 202 acquires job identification data like jobId, job phase and userId from the job request. The jobId identifies the instance and type of analysis job that is currently performed, the job phase determines the currently executed phase of the job and the userId identifies the user or department that requested the job execution. Following step 203 fetches data identifying the execution environment of the monitored worker monitor 117 which executes the sensor, like a clusterId 125 identifying the worker cluster 116 of the monitored worker process 117. Identification data may also include a rackId identifying the rack to which the host computer executing the worker process is deployed, or data identifying the host computer.

Step 204 stores the acquired identification data for the requested job execution and the worker process execution environment in the tag storage 124 of the agent 118. The process then ends with step 205.

FIG. 2b describes the execution of a worker exit sensor 121, which is instrumented to a method of the worker process that is executed after the analysis processing requested by a job request is finished. In case of a worker method 119 that receives job requests, performs analysis processing and then returns a job response as displayed in FIG. 1, the worker exit sensor is instrumented to the exit of the worker method.

Execution of the worker exit sensor starts with step 210 when analysis processing is finished. Subsequent step 211 clears the tag storage 124 of the agent 118. A cleared tag storage indicates that currently no job is executed by the monitored worker process 117. Processing then ends with step 212.

The process of cyclic acquisition of process resource utilization measurements and reporting the acquired measurements in form of tagged measurement events 132 to a monitoring node 146 is shown in FIG. 2c.

The process is executed periodically with a specific reporting frequency (e.g. every 1, 5 or 10 seconds) and starts with step 220 when the point in time of the next scheduled measurement acquisition is reached. Subsequent step 221 fetches data identifying the execution environment of the monitored worker process 117 like the clusterId 125 of the worker process cluster 116 containing the monitored worker process and the agentId 126 identifying the monitored worker process.

Following step 222 checks if the tag storage 124 contains tag data identifying the job and job phase that is currently executed by the monitored worker process 117. In case no tag data is available in the tag storage 124, the process continues with step 224 which creates a tagged measurement event 132 with tag data 133 not set indicating that no job was executed during measurement acquisition. In case tag data is available in the tag storage 124, it is used to set the tag data 134 of the created tagged measurement event 132 to identify the currently executed job in step 223. AgentId 138 and timestamp 139 are in both cases set to the value of the agentId 126 of the agent 118 and the current point in time.

Step 225 is executed after step 223 or 224 and fetches measurements describing the current resource utilization of the monitored worker process 117. For each measure subscription 127 in the measure subscription list 130 of the agent 118, the measurement acquisition rule 129 is executed to acquire a performance or resource utilization measurement, a measurement entry 141 is created, its value 142 is set to the acquired measurement, its measure type 143 is set to the measure type 128 of the measure subscription 127 and the created measurement entry 141 is appended to the measurement list 140 of the created tagged measurement event 132. Subsequent step 226 sends the tagged measurement event 132 to a monitoring node 146 for processing. The process then ends with step 227.

Processing performed by a monitoring node to process incoming tagged measurement events 132 and to query time series records 150 for a specific job or job phase is shown in FIG. 3.

FIG. 3a describes the processing of an incoming tagged measurement event 132 by the monitoring node 146. The process starts with step 301 when the monitoring node receives a tagged measurement event 132 from an agent 118. Following step 302 extracts data to build time series Id data from the received tagged measurement event 132 for each measurement entry 141 in the measurement list 140 of the tagged measurement event 132. The extracted data consists in jobId 134, job phase 135, userId 136 to identify the job execution that was executed on the monitoring worker process 117 during measurement acquisition, clusterId 137 and agentId 138 to identify the monitoring worker process 117 that is the origin of the received tagged measurement event, and the measure type 143 identifying the type of the measure value 142 of the current measurement entry 141. Time series 150 with a time series Id 151 matching the extracted id data are queried from the time series repository 149 for each received measurement entry 141. In case no matching time series is found, a new one is created with the extracted time series Id data and inserted into the time series repository 149. For tagged measurement events 132 created during a time period in which no job was executed on the monitored worker process 117, the tag data identifying the corresponding job execution, like jobId, job phase and userId is not set. In this case, also a time series with not set job identification data is created and used. Such measurements represent the resource utilization of a monitored worker process 117 during idle time.

Following step 303 creates a date point entry 159 for each measurement entry 141 received with the tagged measurement event 132 using the measurement value 142 of the measurement entry to set the value 161 of the data point 150 and the timestamp 139 of the tagged measurement event to set the timestamp 160 of the data point 159. The created and initialized data point entry is appended to the previously fetched or created time series 150 with a measure type 157 matching the measure type 143 of the measurement entry 141. The process then ends with step 304.

FIG. 3b shows an exemplary query for time series describing the utilization of a specific resource by a specific job that was triggered by a specific user.

The process starts with step 310 when the analysis and visualization module 163 receives a query for time series 150 with a specific jobId 152 and a specific userId 154.

Subsequent step 311 queries the time series repository 149 for time series records 150 with matching jobId 152, userId 154 and measure type 157. Other time series Id data like job phase 153, clusterId 155 or agentId 156 is ignored for the query. The query result contains time series records 150 with any job phase 153, cluserId 155 and agentId 156 and with the specified jobId 152, userId 154 and measure type 157.

Following step 312 returns the matching time series records 151 and the process ends with step 313.

The time series returned by the process described in FIG. 3b represent the resource utilization caused by the processing of all job phases of a specific job execution triggered by a specific user on all monitored worker processes 117 in all worker process clusters 116.

This set of time series can be used for various visualization tasks to depict details of the resource utilization caused by the specific job. As an example, for a visualization showing the resource utilization caused by different phases of the job, time series with the same job phase 153 may be grouped, and the data points of time series 150 with the same job phase but different agentId and clusterId may be aggregated. The resulted aggregated, per job phase time series may be used to depict the utilization of a specific process resource (e.g. used memory or CPU) of the phases of the specified job on all monitored worker processes 117. See e.g. FIG. 7, which shows in the upper section a stacked bar chart visualization of CPU utilization of the phases of a specific job and in the lower section a stacked bar chart visualization of the memory utilization of the phases of a specific job. Each stack represents the resource utilization in a specific time period (e.g. 30 sec or 1 minute) and each segment of the stacks colored in a different shade of grey represents the resource utilization of a specific job phase.

Another aggregation of the filtered time series may group time series with the same clusterId 155 and aggregate the measurement values of time series in the same group. The resulting aggregated time series would show the resource utilization caused by the job execution on different worker process clusters 116 regardless of the job phase. Various other aggregations and visualizations are possible, including e.g. multidimensional visualizations showing the resource utilization caused by the specified job execution by each job phase (first dimension) on each cluster (second dimension).

A block diagram showing an overview of an agent based transaction tracing and monitoring system that uses tag data stored in a tag storage 124 that identifies a currently ongoing execution of a job by the monitored worker process to tag transaction tracing data with data identifying the job and job phase that was performed during the execution of the monitored application is shown in FIG. 4.

A monitored transaction executes an instrumented method 403 in a parent thread 401 that is executed by a monitored worker process. An entry sensor 404 is instrumented to the entry of the instrumented method and an exit sensors 407 are instrumented to all exit points of the instrumented method 403. Those sensors report start and end of the execution of the instrumented method 403 as part of the monitored transaction to the agent 118 and store correlation data to identify the parent thread 401 in a tag info 409 which may be stored in the thread local storage of the parent thread. The execution of the instrumented method 403 calls a thread switch method 405 which is instrumented with a tagging sensor 406. A thread switch method 405 performs the activation 410 of child thread 412. The tagging sensor 406 modifies the thread activation in a way that it transfers parent information 411 identifying the parent thread to the activated child thread 412. Starting the child thread causes the execution of a tag extraction sensor 402 within the child thread 412, which stores the parent identification data received with the parent information 411 in a tag info record 409 stored in the thread local storage of the child thread. Subsequent execution of another instrumented method 413 triggers the execution of an entry sensor 404 and an exit sensor 407 by the child thread. The sensors report the execution of the instrumented method 413 to the agent in form of path events. Additionally they report the parent/child relationship between thread 401 and 412 which allows to create end-to-end transaction trace data spanning multiple threads. A detailed description of the creation and processing of path events describing end-to-end transaction traces can be found in U.S. Pat. No. 8,234,631.

The path event processing module 414 of the agent 118 utilizes the job identification data stored in the tag storage 124 to tag path events 421. This allows to identify the job execution that was performed on the monitored worker process 117 while the monitored transaction was executed. The path event processing module also tags the path event with the agentId 126 of the agent and afterwards sends 416 the path events to the monitoring node 146 via connecting computer network 415. Path events 421 are received by the monitoring node and processed by the correlation engine 417 to represent end-to-end transaction trace data of the monitored transactions. The created end-to-end transaction trace data also contains tag data identifying a job execution that was performed on the monitored worker process 117 while the monitored transaction was executed on it.

The created end-to-end transaction trace data is stored 418 in the path repository 419 from which it is requested 420 by the analysis and visualization module 163.

FIG. 5 depicts data records that are used to transfer and store transaction trace data describing a monitored transaction, together with tag data allowing to identify a job execution that was performed on a monitored worker process concurrent to the execution of the monitored transaction. FIG. 5*a* shows a start path event node 501 which is used to transfer transaction trace data describing a new monitored thread execution from entry sensors 404 to an agent 118 and from an agent to a monitoring node 146. A start path event node 501 may contain but is not limited to parent data 502 identifying the monitored thread execution that triggered the monitored thread execution reported by the start path event node, local data 503 identifying the reported new monitored thread execution and tag data 504 which may be used to identify the job execution which was ongoing while the new reported thread execution was running.

The tag data 504 may contain but is not limited to a jobId 505 identifying the currently executed job, a job phase 506 identifying the currently executed phase of the job, an userId 507 identifying the user or department that triggered the execution of the job and a clusterId 508 identifying the worker process cluster 116 to which the monitored worker process 117 executing the thread is assigned.

A start path node 510, which may be used to represent thread executions in end-to-end transaction trace data created by the correlation engine 417 and stored in the path repository 419, is shown in FIG. 5*b*.

A start path node may contain but is not limited to parent path information 511 identifying the start path node 510 describing the parent thread execution, path info 512 containing identification data of the thread execution together with tracing data describing the thread internal processing of the monitored transaction and tag data 512 allowing to identify the job processing that was ongoing while the execution of the monitored transaction.

The agent side and correlation engine side processing to combine transaction trace data with tag data identifying an ongoing job processing, together with a process describing an exemplary query for transactions corresponding to a specific job execution is shown in FIG. 6.

The processing performed by the path event processing unit 414 to set job identification tag data to transaction trace data is shown in FIG. 6*a*. The process starts with step 601 when the path event processing unit receives transaction trace data from an entry sensor 404 indicating a new monitored thread execution in form of a start path event node 501. The entry sensor sends such a start path event node when it detects that the current execution of an entry sensor is the first execution by the current thread. State data in the tag info node 409 stored in the thread local storage may be used to determine if an execution of an entry sensor is the first one within a thread. Subsequent step 602 checks if the thread execution reported by the start path event node 501 represents a new monitored transaction execution. This may be performed by checking if the parent data 502 of the start path event node 501 is not set. Not set parent data indicates that there is no monitored parent thread execution of the current monitored thread execution available, which indicates a new monitored transaction. In case the parent data 502 is not empty, the process ends with step 606. Otherwise, the process continues with step 604 which checks if the tag storage 124 contains tag data identifying the currently performed job processing. In case the tag storage contains no tag data, the process ends with step 606. In case tag data is available in the tag storage 124, the process continues with step 605 which initializes the tag data 504 of the start path event node 501 with job identification tag data from the tag storage 124. Afterwards, the process ends with step 606.

The processing described in FIG. 6*a* is directed to tag whole end-to-end transactions with corresponding job identification trace data, because step 603 checks if a new monitored transaction is started and avoids setting job identification tag data in case of a monitored thread execution that has a monitored parent thread execution and thus does not start a new monitored transaction. This tagging behavior is suitable for monitoring situations with agents 118 deployed to worker processes 117, monitoring only worker process side transaction executions.

In case of a monitoring situation with an agent 118 also deployed to the job tracker 103*b*, transaction trace data is created that spans from the job tracker 103*b*, via job requests to multiple individual worker processes 117. An alternative tagging behavior would be required in such a situation. The alternative behavior would skip step 603 of the process described in FIG. 6*a* and tag start path event nodes 501 even if they do not represent a new monitored transaction. The resulting end-to-end transaction trace data would describe the processing of the whole parallel job execution on all worker processes. This end-to-end transaction trace data would then contain descriptions of parallel thread executions performed by different worker processes with job identification data differing in e.g. job phase or clusterId. An instrumentation situation including monitoring of job tracker activities could e.g. be used to create measurements describing the progress of individual job phases in percentage terms. To achieve this, the job tracker monitoring requires an instrumentation that fetches the number of job requests sent for a specific job and a specific job phase. Typically, the job tracker determines the number of required workers for a job by analyzing the job input data. An instrumentation placed in the functionality that performs this calculation provides the number of required workers allows to retrieve the number of worker process before job request are sent to worker processes. A second instrumentation is required at the job tracker that identifies and counts job responses for a specific job and a specific job phase. The relating the number of required workers and the received job responses for a specific job and a specific job phase generates a measurement describing the completion rate of a specific job phase of a specific job. The generated completion rate measurement may be sent to a monitoring event with a tagged measurement event 132, which may be configured with tag data 134, agentId 137 and timestamp 138 as described before. Processing of those tagged measurement events 132 may be performed on the monitoring node 146 as described before.

FIG. 6b shows the processing of tag data received with incoming start path event nodes by the correlation engine to create tagged end-to-end transaction trace data.

The process starts with step 610 after a new start path event node 501 was received by the correlation engine 417 and the correlation processing to update end-to-end transaction trace data describing the processing of a monitored transaction containing the thread execution reported by the received start path event node is finished. A start path node 510 is stored in the path repository 419 as part of end-to-end transaction trace data and represents a thread execution reported by a received start path event node. Following step 611 checks if the tag data 504 of the received start path event node 501 is set. In case tag data 504 is not set, the process ends with step 614. Otherwise, the process continues with step 613 which sets the tag data 504 received with the start path event node 501 to the tag data 513 of the corresponding start path node 510. The process then ends with step 614.

The end-to-end transaction trace data containing available job identification tag data is stored in the path repository 419.

An exemplary query of the path repository 419 for end-to-end transaction trace data with specific job identification tag data is shown in FIG. 6c.

The process starts with step 620, when the path repository receives a request for transaction trace data corresponding to specific job identification data. The received job identification data may contain jobId, job phase, userId and clusterId to identify transactions corresponding to a specific job phase of a specific job triggered by a specific user that were executed in a specific worker process cluster. The received job identification data may also consist in a subset of the job identification data, like only a userId to identify transactions corresponding to job executions triggered by a specific user or department, or only a jobId to identify transactions corresponding to all job phases of the job identified by the jobId, regardless of the user that triggered the job execution or the cluster in which the transaction was executed.

Following step 621 checks for each end-to-end transaction trace data if the tag data 512 stored in the start path node 510 of the end-to-end transaction trace that describes the initial thread execution of the transaction matches the job identification data received in step 620.

Subsequent step 622 returns the list of end-to-end transaction trace data matching the received job identification data. The process ends with step 623.

An exemplary visualization of measures describing the resource utilization of a specific job split by the phases of the specific job is shown in FIG. 7.

The visualization is split into a chart 701 describing the CPU utilization caused by the job and a chart 710 describing the memory utilization caused by the job. The visualization of the measurements is performed by a stacked bar chart. Each bar of the chart represents a specific time frame (e.g. 10 sec, 30 sec, 1 minute or 5 minutes). The bars shown in chart 701 are built by stacked bar fragments 702, each bar fragment representing the CPU usage of a specific phase of the selected job during a specific time period. The measurement values representing each bar fragment may be obtained by querying the time series repository 149 for time series records 150 with matching jobId and a specific job phase. Those time series represent the resource utilization caused by the execution of job phases on all monitored worker processes. Data points 159 of all matching time series 150 that fall into the time period represented by the current bar are fetched and accumulated to calculate the resource utilization by a job phase of the selected job during the time period represented by the current bar in the chart. The stacked bar chart representation eases the optical comparison of resource utilizations of different job phases.

A line chart 703 representation is used for the representation of wall clock duration of different job phases. This representation eases the optical determination of the job phase with the highest wall clock time.

A stacked bar chart visualization is also selected to show the memory utilization of the phases of the selected job in chart 710. Each segment 711 of a bar corresponds to the memory usage of a job phase during the time period (e.g. 10 sec, 30 sec, 1 minute or 5 minutes) represented by the bar.

FIG. 8 conceptually depicts an exemplary user interaction to filter end-to-end transaction trace data corresponding to a time segment of the execution of a specific phase of a specific job that shows an unexpectedly high CPU utilization.

The CPU usage chart 701 of a specific selected job shows CPU utilization for a specific job phase during a specific time period that is higher than expected which is visualized by stack segment 801. The user right clicks 802 the stack segment 801 with the mouse and gets a list of end-to-end transaction trace records 803 corresponding to the right-clicked stack segment. The monitoring system determines the corresponding end-to-end transactions by filtering transactions with jobId 513 and job phase 514 matching the selected job and the job phase represented by the clicked bar segment, and which were executed during the time period represented by the stacked bar of the clicked bar segment 801.

The transaction list 803 which is displayed in response of right-clicking the bar segment shows an overview visualization of the matching transactions in the upper segment, and a detailed view 805 showing individual method executions of the currently selected transaction 804.

Right clicking 806 on the selected transaction 804 in the overview, or on a method of the selected transaction in the transaction detail view 805, opens a summary view 807 of the selected transaction containing measurement values 808 relevant for the selected transaction.

The agent 118 performs tasks to identify job executions and acquire and correlated measurement data corresponding to job executions and also performs tasks to identify transaction executions and correlate the transaction executions to concurrently performed job executions. The agent 118 may be subdivided into a measurement agent responsible to acquire and correlate measures and a reporting agent responsible to identify and correlate transaction executions.

Worker entry sensors 120 and entry sensors 404 are described as distinct building blocks of disclosed invention performing the distinct tasks of detecting a received job request and detecting the start of a method execution within monitored transactions. Worker entry sensors 120 may however provide in addition the functionality to detect the start of method executions, and entry sensors 404 may in addition provide the functionality to detect receiving of job requests without leaving the scope and spirit of the disclosed invention. Same is applicable for worker exit sensors 121 and exit sensors 407.

Referring now to a monitoring setup that in addition to the execution layer for massive parallel big data analysis jobs as described above, also monitors the analysis control layer. Typically, individual massive parallel job executions as e.g. MapReduce jobs executed in an Apache Hadoop environment, represent only a small part of more complex data analysis tasks. Those more complex analysis tasks are controlled and executed by analysis controller modules that generate massive parallel job execution requests and drive a job execution environment to execute those jobs, based on complex analysis plans. The Apache Hadoop ecosystem provides a script based analysis controller called Apache PIG to perform this task. Apache PIG provides a scripting language called PIG Latin designed and optimized to express complex big data analysis tasks. PIG Latin provides, beneath a set of built in commands to perform and combine massive parallel job executions, an interface to create and execute user defined commands or functions (UDFs). Such UDFs may be used to structure analysis scripts and to hide complexity, however they may also, if used inappropriately, cause inefficient or undesired usage of the job execution environment.

A monitoring system also including the analysis control layer may provide monitoring data allowing to identify inefficient analysis scripts and UDFs. An overview of a monitoring system covering also the analysis control layer of a massive parallel big data analysis system is shown in FIG. 9.

An analysis controller 901 reads an analysis script 902 describing complex analysis tasks and executes 908 the script with a script interpreter 910. The analysis script 902 may contain a name 903 identifying the script. The name of the script may be derived from the name of the file on a hard disc which contains the analysis script. The analysis script 902 may further contain a step list 904 containing the commands 905 and functions 907 required to perform the complex analysis task described by the script. Functions 907 consist in a name 906 and a list of commands 905 and may be considered as a shortcut for those commands. The script language may provide a set of predefined functions and may also allow to specify and use user defined functions. In the Apache PIG environment, user defined functions may be created by writing Java™ classes that extends the base class "org.apache.pig.EvalFunc" and that implement a method "exec". The name of the function is derived from the name of the class, and the method "exec" describes the commands executed by the function. The script interpreter 910 reads and interprets the analysis script 902 and executes the functions called in the script by executing the corresponding function evaluation methods 909. In an Apache PIG environment, this would be the execution of the "exec" method of classes corresponding to functions called by the script. As an example if a script calls the function "UPPER" represented by a Java class "com.udf.UPPER", then calling this function in a script would cause the script interpreter to execute the function evaluation method 911 "exec" of the class "com.udf.UPPER". During execution of a function evaluation method 911, code corresponding to various commands 905 may be executed. Those commands may describe the control flow of the function in form of loops, decisions, branches or jumps, or may describe function internal processing of data received by job executions. A subset of those commands may execute job request methods 913 that create job execution requests 918 and send 915 them to a job execution environment 917 for execution. The job execution environment 917 is responsible to perform the job executions requested by the sent job execution requests 918. The job execution environment may be an environment capable to perform massive parallel analysis tasks, as described in FIG. 1*b*. An example for such job execution environment is an Apache Hadoop installation. A job execution request 918 may contain but is not limited to meta data 919 describing and identifying the requested job execution, like a jobId 919 and a userId 920.

An agent 118 may be deployed to the analysis controller 901 and function sensors 912 and job request sensors 914 may be instrumented to function evaluation methods 911 and job request methods 913 using bytecode instrumentation. Deployment and injection of the agent 118 may be performed according to the teachings of U.S. Pat. No. 8,151,277 "Methods and System for dynamic remote injection of in-process agents into virtual machine based applications" which is included herein by reference in its entirety. Identification of bytecode fragments for instrumentation, like bytecode representing methods may be performed according to the teachings of U.S. Pat. No. 8,464,225 "Methods and System for generically instrumenting interface based software components for the purpose of performance and failure diagnosis and monitoring, such as database drivers" which is included herein by reference in its entirety. The selection of methods to be instrumented by a function sensor 912 may be performed by selecting methods with the name "exec" of classes deriving from a base class "org.apache.pig.EvalFunc". The selection of methods to be instrumented by a job request sensor may be performed by instrumenting methods handling the handover of job executions specified in an analysis script to the job execution environment. In an Apache PIG environment an example for such a method is the method "visit" of the class "MapReduceOper" in the package "org.apache.pig.backend.hadoop.executionengine.mapReduceLayer". The method "visit" inherited from a base class "Operator" which represents individual commands of a script and is executed by the Apache PIG script interpreter during the processing of scripts. The function sensor 912 is executed when a function evaluation method 911 is executed and extracts data describing the function, like the function name 906 or the name 903 of the analysis script including the function call from the context data maintained by the script interpreter 910 during script processing. In addition, the function sensor may extract measurement data describing the function execution, like the duration of the function execution or the amount of result data produced by the function execution. On execution, the function sensor 912 may create a path event node 925 describing the execution of the function evaluation method as part of an enclosing monitored transaction, set its local data 926 to identify the current thread execution, its method call correlation data 927 to identify the current function execution within the current thread, including data to reconstruct call nesting level and method call sequence in later created end-to-end transaction trace data. Setting and processing those parts of the created path event node 925 and correlating it together with other path events to form end-to-end transaction trace data may be performed according to the teachings of U.S. Pat. No. 8,234,631 "Methods and System for tracing transactions throughout distributed heterogeneous applications without source code modifications" which is included herein in its entirety. The function sensor 912 may in addition set the tag data 928 of the created path event node 925 with data identifying the type of function execution, like the function name 930 or the script name 929 and measure data 933 like the result data size 934 and execution duration 935. The function sensor forwards 909 the path event 925 to the agent 118 which adds its agentId 126 to the local data of the path event node to allow identification of the virtual machine or process executing the thread identified by the local data 926 set by the function sensor. The agent 118 forwards 923 the path event node 925 to a monitoring node 146 for further processing.

A job request sensor 914 is executed when the script interpreter 910 executes a script command 905 that causes sending of a job execution request 918 to a job execution environment 917. The job request sensor 914 may capture job description and identification data, like a jobId 919 or userId 929 from context data maintained by the analysis controller during execution of a script, and create and initialize a path event node describing the current execution of a job request method 913 and set the captured values of jobId and userId to the corresponding jobId 931 and userId 932 tags of the created path event node 925. Setting of local data and method call correlation data 927 may be performed by the function sensor 912. The method call correlation data 927 allows to reconstruct method call sequence and nesting levels. End-to-end transaction trace data containing trace data describing executions of function evaluation methods 911 and job request methods 913 allows to determine which job execution request method was called during the execution of function evaluation method.

Proceeding now to FIG. 10 which conceptually describes the execution of a function sensor 912 and a job request sensor 914. FIG. 10*a* shows the execution of a function sensor which starts with step 1001 when a function evaluation performed by the script interpreter is ended. In a subsequent step 1002, the sensor captures the name of the currently executing script and the name of the currently executing function. Following step 1003 fetches measurement data describing the current function execution, like the duration of the function execution or the amount of result data created by the function. Afterwards, step 1005 creates a path event node, stores the previously acquired tag and measurement data in the created path event node and sends it to the agent 118 deployed to the process executing the function sensor. The process then ends with step 1005.

The execution of a job request sensor 914 is described in FIG. 10*b*. The process starts with step 1010 when the script interpreter 910 executes a method that sends a job execution request 918 to a job execution environment 917 which causes the job request sensor instrumented to the method to be executed. In a following step 1011, the job request sensor acquires job identification and description data like a jobId identifying the requested job execution and a userId identifying the user or department requesting the job execution. Following step 1012 creates a path event node, sets the previously acquire tag data to the tag section 928 of the created path event node 925 and send it to the agent 118. The process then ends with step 1013.

Both function sensor 912 and job request sensor 914 may be split into an entry sensor part and an exit sensor part, notifying the entry and exit of the execution of the method they are deployed to, to create tracing data allowing to reconstruct method call sequence and nesting levels according to the teaching of U.S. Pat. No. 8,234,631. Creating and processing of correlation data by entry and exit sensors is described in U.S. Pat. No. 8,234,631, but it is not relevant for the understanding of the current disclosure and was thus omitted for brevity.

Referring now to FIG. 11 which shows exemplary end-to-end tracing data describing the processing of a complex analysis script by an analysis controller and corresponding end-to-end tracing data and time series data describing job executions in a job execution environment 917 caused by the script processing. A start path node 510*a* describes the execution of a function as first monitored method execution within a thread. The start path node 510*a* contains a script name 1101 and a function name 1102 stored in the tag data section 513*a* of the start path node 510*a* identifying the function and the script containing the function call. A path node 1104 describing the execution of a job request method is linked 1103 with the start path node 510*a* in a way that describes a nested method call. The tag data section 1105 of the path node 1104 contains a jobId 1106 and a userId 1107. JobId 1106 and userId 1107 may be used to filter 1108 and 1109 time series 150 with matching jobId 152 and userId 154. Those time series represent resource consumptions caused by the job execution that was performed by the job execution environment 917 in response to the reception of the job execution request described by path node 1104. Similar filtering 1110 and 1111 may be performed to retrieve end-to-end transaction trace 510 data corresponding to the requested job execution. The monitoring and tracing data generated by a monitoring system that also monitors the control layer of a big data analysis system allows to trace back the root cause of undesired job executions or job executions causing unexpected resource consumption to the analysis script 902 and within the analysis script to the function 907 that caused the job executions.

The monitoring node 146 may provide query interfaces that allow to select one or more end-to-end transaction traces describing script executions performed by the analysis controller and containing path nodes identifying job execution requests 1104 and that further allow to query corresponding trace data describing execution details of the requested job executions as performed by the job execution environment 917. As an example, a user of the monitoring system may review transaction trace data describing analysis controller 901 side processing and identify trace data showing a function evaluation method 911 execution with higher than expected duration. The user may further navigate to trace data describing job request method 913 executions performed by the previously detected function evaluation method execution and may select trace data describing a job request method 913 execution with higher than expected duration. The trace data describing selected job request method 913 provides tag data 1105 in form of a jobId 1106 and userId 1107. The monitoring node 146 may provide user interaction mechanisms to query for worker process side end-to-end transaction trace data corresponding to jobId 1106 and userId 1107. As an example, the monitoring node may provide a context menu entry "fetch corresponding worker transactions" which is attached to the visualization of transaction trace data representing the execution of a job request method 913.

On activation of this user interaction mechanism, the monitoring system may read jobId 1106 and userId 1107 from the selected transaction trace data and search the path repository 419 for transaction trace data representing transaction executions performed on worker processes 117 and having a matching jobId 515 and userId 516. The so identified worker process side transaction trace data represents transaction caused by the previously identified job request method 913 execution with higher than expected duration and may provide data allowing to identify the root cause for the longer than expected duration.

A similar query interface may be provided to identify time series 150 describing resource utilizations caused by job executions on worker processes that were requested by an analysis controller during execution of a specific function of a specific analysis script.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The functionality of the disclosed monitoring system was described in the context of a big data analysis system using massive parallel analysis processing based on the Hadoop™ framework and processing infrastructure developed by Apache. Although Hadoop™ is the most commonly used solution for big data analysis tasks in the industry, there exist other, alternative offerings by other vendors providing similar analysis infrastructure systems. Stratosphere (see http://stratosphere.eu) or Apache Spark (see http://http://spark.apache.org/) are examples for such alternatives. Both provide a similar infrastructure for massive parallel analysis tasks by adding more flexibility to the design of analysis job tasks, allowing alternative coordination methods than the map/reduce approach used by Hadoop. The disclosed monitoring system may be applied to those Stratosphere or Apache Spark based big data analysis systems and other alternative implementations without leaving the spirit and scope of the invention. Additionally, the disclosed monitoring system may be used to monitor the resource utilization of batch processes of any kind.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Further areas of applicability will become apparent from the description provided herein. The description and specific examples in this summary are intended for purposes of illustration only and are not intended to limit the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring resource consumption by individual jobs executing in a distributed computing environment that processes large data sets across clusters of server devices, comprising:

receiving, by a worker entry sensor instrumented in a worker application, a job request from a job manager located across a network remotely from the given server device, where the job request is one of a plurality of job requests processing a large data set in parallel and the worker application resides on a given server device in the cluster of server devices;

extracting, by the worker entry sensor, identifying information for the job request from the job request received by the entry sensor;

storing, by the worker entry sensor, the identifying information for the job request in a data store residing on the given server device;

determining, by a measurement agent residing on the given server device, metrics indicative of resource utilization by the worker application while the worker application is processing the job request;

determining, by the measurement agent, identifying information for the measurement agent;

retrieving, by the measurement agent, the identifying information for the job request from the data store for insertion into the measurement event;

generating, by the measurement agent, a measurement event, where the measurement event includes the identifying information for the job request, the identifying information for the measurement agent, and the performance metrics;

sending, by the measurement agent, the measurement event to a monitoring node residing across the network remotely from the given server device;

detecting, by an exit sensor instrumented in the worker application, a job result for the job request; and deleting, by the exit sensor, the identifying information for the job request from the data store, where the job result is being returned by the worker application and the deletion of the identifying information is in response to detecting the job result.

2. The method of claim 1 wherein receiving a job request further comprises receiving the job request from a job manager operating in accordance with a MapReduce model.

3. The method of claim 1 wherein receiving a job request further comprises receiving the job request from a job manager operating in accordance with a software framework that executes parallel calculations on the large data set.

4. The method of claim 1 wherein identifying information for the job request includes an identifier for a particular job being requested, an identifier for phase of the particular job being requested, and an identifier for an entity requesting the job execution.

5. The method of claim 4 wherein the identifying information for the job request further includes an identifier for a cluster to which the worker application belongs, an identifier for the server device, or an identifier for a rack on which the server device resides on.

6. The method of claim 1 further comprises storing, by the entry sensor, the identifying information for the job request in a data store residing on the given server device, and retrieving, by the measurement agent, the identifying information for the job request from the data store for insertion into the measurement event.

7. The method of claim 1 wherein the performance metrics includes at least one of CPU usage or memory usage of the worker application.

8. The method of claim 1 further comprises determining, by the measurement agent, at least one metric describing a locality of data accesses by the worker application while the worker application is processing the job request.

9. The method of claim 1 further comprises
receiving, by the monitoring node, the measurement event from the measurement agent;
correlating, by the monitoring node, performance metrics from the measurement event with other performance metrics associated with the job request; and storing, by the monitoring node, the correlated performance metrics in a data repository residing on the monitoring node.

10. The method of claim 9 further comprises correlating the performance metrics in a time series.

11. The method of claim 9 further comprises visually depicting, by the monitoring node, performance metrics in a time series using a bar chart, each bar in the bar chart represents a given performance metric at a specific time period and bars are subdivided into specific phases which comprise the job.

12. The method of claim 6 further comprises:
detecting, by a path sensor instrumented in the worker application, at least one of initiation or termination of a transaction executed by the worker application;
sending, by the path sensor, a path event to a reporting agent residing on the given server device, where the path event include identifying information for the worker application and transaction trace data including at least one of a start time for execution of the transaction by the worker application or an end time for the execution of the transaction by the worker application;
retrieving, by the reporting agent, the identifying information for the job request from the data store;
appending, by the reporting agent, the path event received from the path sensor with identifying information for the job request and identifying information for the reporting agent; and
sending, by the reporting agent, the path event to the monitoring node.

13. The method of claim 11 further comprises determining, by the path sensor, performance measures for the transaction executed by the worker application and including the performance measures in the path event sent to the reporting agent.

14. The method of claim 11 further comprises correlating, by the monitoring node, transaction trace data with the performance metrics from the measurement event using the identifying information for the job request.

15. The method of claim 1 further comprises instrumenting bytecode of select methods called by a script; and executing the script by the data analysis controller, where execution of the script results in one or more job execution requests.

16. The method of claim 15 further comprises
detecting, by a function sensor instrumented in one of the select methods, execution of a function by the data analysis controller;
extracting, by the function sensor, an identifier for the script and an identifier for the function from context data maintained by the data analysis controller;
determining, by the function sensor, measurement data describing execution of the function by the data analysis controller;
generating, by the function sensor, a path event for the function, where the path event includes the identifier for the script, the identifier for the function and the measurement data; and
transmitting, by the function sensor, the path event to the monitoring node.

17. The method of claim 16 wherein the measurement data is further defined as one of duration of execution of the function or amount of results produced by the execution of the function.

18. The method of claim 16 further comprises
receiving, by the monitoring node, the path event from the function sensor;

correlating, by the monitoring node, the measurement data from the path event with performance metrics from the measurement event; and storing, by the monitoring node, the correlated measurement data in a data repository on the monitoring node.

19. The method of claim 16 further comprises instrumenting bytecode of select methods executed by the data analysis controller, where the select methods send requests to execute jobs from the data analysis controller to a job execution environment;

detecting, by a job request sensor instrumented in one of the select methods, sending of a request to execute a job;

extracting, by the job request sensor, identifying information for the job which is requested to be executed;

generating, by the job request sensor, a path event for the job execution request, where the path event includes the identifying information for the job and correlation data to identify method call sequence and nesting;

transmitting, by the job request sensor, the path event to the monitoring node.

20. The method of claim 19 further comprises receiving, by the monitoring node, the path event from the job request sensor;

correlating, by the monitoring node, the path events from the function sensor with the path event from the job request sensor; and storing, by the monitoring node, the correlated events in a data repository on the monitoring node.

21. The method of claim 16 further comprising querying, at the monitoring node, a path repository for transaction trace data of transactions executed by the worker application during processing of a job identified by job identification data, where the job identification data matches the job identification data of tracing data describing a job execution request performed by the data analysis manager during execution of the script.

22. The method of claim 16 further comprising querying, at the monitoring node, a time series repository for time series data describing resource utilization caused by the worker application during processing of a job identified by job identification data, where the job identification data matches the job identification data of tracing data describing a job execution request performed by the data analysis manager during execution of the script.

23. A computer-implemented method for monitoring resource consumption by individual jobs executing in a distributed computing environment that processes large data sets across clusters of server devices, comprising:

detecting, by a path sensor instrumented in a worker application executing in a first thread, at least one of initiation or termination of a transaction executed by the worker application, where the worker application resides on a given server device in the cluster of server devices;

sending, by the path sensor, a path event to a reporting agent residing on the given server device, where the path event include identifying information for the worker application, an identifier for the first thread, and at least one of a start time for the transaction execution of the worker application or an end time for the transaction execution of the worker application;

retrieving, by the reporting agent, identifying information for a job request from a data store residing on the given server device, where the job request is one of a plurality of job requests processing a large data set in parallel and was received by the worker application from a job manager located across a network from the given server device and where the data store is accessible for all threads of the worker application;

appending, by the reporting agent, the identifying information for the job request to the path event received from the path sensor;

sending, by the reporting agent, the path event to a monitoring node residing across the network from the given server device;

detecting, by an exit sensor instrumented in the worker application, a job result for the job request; and deleting, by the exit sensor, the identifying information for the job request from the data store, where the job result is being returned by the worker application and the deletion of the identifying information is in response to detecting the job result.

24. The method of claim 23 wherein job manager is further defined as a MapReduce engine.

25. The method of claim 23 wherein identifying information for the job request includes an identifier for a particular job being requested, an identifier for phase of the particular job being requested, and an identifier for an entity requesting the job execution.

26. The method of claim 25 wherein the identifying information for the job request further includes an identifier for a cluster to which the worker application belongs, an identifier for the server device, or an identifier for a rack on which the server device resides on.

27. The method of claim 23 further comprises determining, by the path sensor, performance measures for the transaction execution by the worker application and including the performance measures in the path event sent to the reporting agent.

28. A computer-implemented method for monitoring resource consumption by individual jobs executing in a distributed computing environment that processes large data sets across clusters of server devices, comprising:

receiving, by a worker entry sensor instrumented in a worker application, a job request from a job manager located across a network remotely from the given server device, where the job request is one of a plurality of job requests processing a large data set in parallel and the worker application resides on a given server device in the cluster of server devices;

extracting, by the worker entry sensor, identifying information for the job request from the job request received by the entry sensor;

storing, by the worker entry sensor, the identifying information for the job request in a data store residing on the given server device;

determining, by a measurement agent residing on the given server device, metrics indicative of resource utilization by the worker application while the worker application is processing the job request;

determining, by the measurement agent, identifying information for the measurement agent;

retrieving, by the measurement agent, the identifying information for the job request from the data store for insertion into the measurement event;

generating, by the measurement agent, a measurement event, where the measurement event includes the identifying information for the job request, the identifying information for the measurement agent, and the performance metrics;

sending, by the measurement agent, the measurement event to a monitoring node residing across the network remotely from the given server device;

detecting, by an exit sensor instrumented in the worker application, a job result for the job request;

deleting, by the exit sensor, the identifying information for the job request from the data store, where the job result is being returned by the worker application and the deletion of the identifying information is in response to detecting the job result;

detecting, by a path sensor instrumented in the worker application executing in a first thread, at least one of initiation or termination of a transaction by the worker application;

sending, by the path sensor, a path event to a reporting agent residing on the given server device, where the path event include identifying information for the worker application and transaction trace data including at least one of a start time for the transaction execution of the worker application or an end time for the transaction execution of the worker application;

retrieving, by the reporting agent, identifying information for a job request from the data store;

appending, by the reporting agent, the identifying information for the job request to the path event received from the path sensor; and sending, by the reporting agent, the path event to the monitoring node.

29. The method of claim 28 wherein receiving a job request further comprises receiving the job request from a MapReduce engine.

30. The method of claim 28 wherein identifying information for the job request includes an identifier for a particular job being requested, an identifier for phase of the particular job being requested, and an identifier for an entity requesting the job execution.

31. The method of claim 30 wherein the identifying information for the job request further includes an identifier for a cluster to which the worker application belongs, an identifier for the server device, or an identifier for a rack on which the server device resides.

32. The method of claim 28 wherein the performance metrics includes at least one of CPU usage or memory usage of the worker application.

33. The method of claim 28 further comprises determining, by the measurement agent, at least one metric describing a locality of data accesses by the worker application while the worker application is processing the job request.

34. The method of claim 28 further comprises
receiving, by the monitoring node, the measurement event from the measurement agent;
correlating, by the monitoring node, performance metrics from the measurement event with other performance metrics associated with the job request; and
storing, by the monitoring node, the correlated performance metrics in a data repository residing on the monitoring node.

* * * * *